US00RE33955E

United States Patent [19]

Rowsell et al.

[11] E Patent Number: Re. 33,955

[45] Reissued Date of Patent: Jun. 9, 1992

[54] HAZARDOUS AND RADIOACTIVE LIQUID WASTE DISPOSAL METHOD

[76] Inventors: Farrell D. Rowsell, 2665 Belcastro St., Las Legas, Nev. 89117; James W. Ayres, 5633 W. Palmyra, Las Vegas, Nev. 89102

[21] Appl. No.: 595,250

[22] Filed: Oct. 3, 1990

Related U.S. Patent Documents

Reissue of:

[64] Patent No.: 4,775,494
Issued: Oct. 4, 1988
Appl. No.: 54,140
Filed: May 11, 1987

U.S. Applications:

[63] Continuation of Ser. No. 743,057, Jun. 10, 1985, abandoned.

[51] Int. Cl.[5] ..... G21F 9/16; G21F 9/08

[52] U.S. Cl. ..... 252/628; 252/631; 106/286.7; 106/286.8; 106/287.1; 210/679; 210/680; 210/691; 210/909; 405/128; 405/129

[58] Field of Search ..... 252/628, 631; 106/286.7, 286.8, 287.1; 210/679, 680, 691, 909; 405/128, 129

[56] References Cited

U.S. PATENT DOCUMENTS

| | | | |
|---|---|---|---|
| 2,531,427 | 11/1950 | Hauser | 252/315.2 |
| 3,167,504 | 1/1965 | Hayden et al. | 252/628 |
| 3,196,106 | 7/1965 | Hayden et al. | 252/628 |
| 3,196,619 | 7/1965 | Shock | 252/628 |
| 3,274,784 | 9/1966 | Shock et al. | 252/628 |
| 3,487,928 | 1/1970 | Canevari | 210/682 |
| 3,956,040 | 5/1976 | Tezuka | 252/8.511 |
| 3,974,125 | 8/1976 | Oswald et al. | 525/531 |
| 4,028,265 | 6/1977 | Barney et al. | 252/628 |
| 4,087,375 | 5/1978 | Tanno | 252/631 |
| 4,113,504 | 9/1978 | Chen et al. | 252/628 |
| 4,149,968 | 4/1979 | Kupiec et al. | 210/665 |
| 4,378,249 | 3/1983 | Beall et al. | 106/74 |
| 4,422,855 | 12/1983 | Sawyer, Jr. | 44/51 |
| 4,439,062 | 3/1984 | Kingsbury | 405/24 |
| 4,442,241 | 4/1984 | Drake | 523/130 |
| 4,454,055 | 6/1984 | Richman | 252/194 |
| 4,473,477 | 9/1984 | Beall | 210/691 |
| 4,517,112 | 5/1985 | Mardis et al. | 252/315.2 |
| 4,528,129 | 7/1985 | Manchak | 252/628 |
| 4,615,809 | 10/1986 | King | 210/751 |
| 4,650,590 | 3/1987 | Beall | 210/691 |

OTHER PUBLICATIONS

Hurlbut et al. 1977, Manual of Mineralogy-19th edition, John Wiley and Sons, New York, pp. 402–403.

*Primary Examiner*—Brooks H. Hunt
*Assistant Examiner*—Ngoclan T. Mai
*Attorney, Agent, or Firm*—Jerry R. Seiler

[57] ABSTRACT

An improved method of disposing of radioactive or hazardous liquids comprises placing the liquids in a container and adding a sodium montmorillonite over intervals until the composition is substantially solid in the container.

7 Claims, No Drawings

HAZARDOUS AND RADIOACTIVE LIQUID WASTE DISPOSAL METHOD

Matter enclosed in heavy brackets [ ] appears in the original patent but forms no part of this reissue specification; matter printed in italics indicates the additions made by reissue.

This is a continuation of co-pending application Ser. No. 06/743,057, filed on Jun. 10, 1985 (abandoned).

BACKGROUND OF THE INVENTION

The disposal of hazardous and radioactive waste materials is of extreme importance. Federal and state laws and requirements covering such disposals are particularly severe and stringent due to the dangers to plant and animal life if the desired standards are not met and the hazardous or radioactive materials become exposed to the environment. Because of the potential dangers, the U.S. Nuclear Regulatory Commission has not only identified the hazardous and radioactive materials to date, which list is continually being amended and updated, but has set forth specific standards and requirements for protecting the environment against such waste materials. The resulting laws and regulations are set forth in 10 CFR, particularly sections 1-199. Other regulations relating to transportation, packaging, labeling and identifying hazardous and radioactive materials are also found in 40 CFR 1-799 and 49 CFR 100-177. Other publications which relate to classifying, indexing and discussing radioactive and hazardous waste materials include DOE/LLW-14T publication "Waste Classification, A Proposed Methodology For Classifying Low-Level radioactive Waste", December 1982, DOE/LLW-17T, "Survey Of Chemical And Radiological Indexes Evaluating Toxicity", March 1983, FW-874, "Hazardous Waste Land Treatment", April 1983 and FW-872 "Guide To The Disposal Of Chemically Stabilized and Solidified Waste", September 1982.

It is the common practice to process liquid hazardous or radioactive materials by adding absorbents in an attempt to enhance handling and transportation, as well as eventual storage thereof. The materials that have been used heretofore include diatomaceous earth, vermiculite or expanded mica such as zonolite and krolite, portland and gypsum cements, as well as clay materials such calcium bentonites. A problem with such materials is that only a relatively small amount of liquid can be absorbed or otherwise treated with less than satisfactory results. For example, liquid materials are desirably transported and disposed of in 55 gallon drums. However, it has been found with the use of these absorbents, solid compositions cannot be achieved or if temporarily achieved, liquid separation occurs during transportation or storage. Any separated or free-standing liquids are especially undesirable because of the potential danger of leakage from a ruptured or opened container. It is to the substantial elimination of such problems that the present invention is directed.

SUMMARY OF THE INVENTION

An improved method of treating hazardous and radioactive liquid waste materials comprises placing the materials in a container, such as a 55 gallon drum, and slowly adding sodium montmorillonite until the mixture has substantially solidified. The resulting composition may be handled, transported and stored under a variety of conditions for extended periods of time without evidence of liquid separation or deterioration. These and other advantages as well as the specific sodium montmorillonite compositions used in the invention will be more particularly described in the following detailed description.

DETAILED DESCRIPTION OF THE INVENTION

The method of solidifying the hazardous and radioactive liquid waste compositions according to the invention applies to a great variety of such materials. For example, in the radioactive waste disposal field, liquids which must be treated and disposed of include reactor plant liquids such as turbine, cutting and lubricating oils, solvent sludges which are used to degrease the reactor components such as Freon TF, cleaning solvents such as Stoddard solvents, decontamination solvents, and aqueous mixtures of the above-noted hydrocarbon materials, particularly those containing between from 5 to about 75% hydrocarbons and even up to 100% hydrocarbons. In addition, a great quantity of such wastes are aqueous liquids, containing over about 95% water contaminated with radioactive materials such as greases from reactor plant turbines. Hospital-sourced contaminated liquids contain radioactive materials used in cancer treatments. From such sources, particularly common materials include the radioactive cobalts such as cobalt 57, cobalt 58 and cobalt 60, cesium, plutonium and uranium isotopes, and the like. However, it is to be understood, according to the invention, that any radioactive materials that are to be disposed of and are defined in the aforesaid laws, regulations, and documents are intended to be included in the compositions treated according to the method of this invention, as well as any later identified and added radioactive materials, regardless of source and regardless of the specific radioactive material or radioisotope.

Common hazardous waste materials include acids, bases, chlorinated hydrocarbons including PCB, dioxins, and the like. Again, these as well as the radioactive materials may be in substantially aqueous liquids, particularly those having 95% or more water, or they may be aqueous mixtures containing up to substantial amounts of hydrocarbons. Moreover, as used herein, "hydrocarbons" is intended to define any such oil, solvents and other hydrocarbons or non-aqueous liquids as generally described above which have been contaminated with radioactive materials or which themselves are considered hazardous chemicals according to governmental regulations.

The material used in the method of the present invention for treating the above-described hazardous and radioactive liquid waste materials is sodium montmorillonite. As defined herein, sodium montmorillonite comprises a montmorillonite in which the major exchangeable cation is sodium and with smaller amounts of calcium and other exchangeable cations. The preferred materials has over about 50% weight milliequivalents of sodium and exhibits a number of other properties as will be discussed hereinafter. A highly useful material is the sodium montmorillonite naturally occurring in Wyoming and certain areas of South Dakota and Montana which exhibits a unique combination of characteristics which qualify it as an extremely efficient solidifying agent in treating the waste compositions according to the invention. Because of the large surface area to weight ratio and net negative surface charge, the concentration of cations, particularly sodium, are held in an exchangeable position on the montmorillonite particle which, when hydrated, act with the mineral structure to produce ordered water layers which are great distances from the particle surfaces. Because of this unique characteristic, the sodium montmorillonite, when added to an aqueous liquid results in a non-pourable flexible matrix that does not undergo phase separation except under extreme temperature and/or pressure conditions far beyond those encountered under storage and handling conditions.

As previously noted, the sodium montmorillonite is that having sodium as the major exchangeable cation, preferably having over a 50% milliequivalent exchangeable cation concentration, and more preferably between about 60 and about 75 sodium meq/%. Other cations include calcium, commonly between about 20 and about 35 meq/% with other typical cations including potassium, magnesium, iron, being in the aggregate range of between about 5 and about 20 meq/%. However, such specific percentages are to be understood to be in the most preferred material, and materials outside of those specific ranges are to be included, again, so long as the major sodium concentration is present. Of course, the naturally occurring material may be obtained from any source, and synthetic materials are also to be included within the purview of the invention.

In addition to the major sodium concentrations, the preferred material possesses high colloid content, liquid limits, plate water retention and cation exchange capacity. The colloid content of the sodium montmorillonite of the invention, is at least about 70%. By the term "colloid content" as used herein, it is intended to define that portion of material that is colloidal in the dispersing medium and has a particle size less than about 2 microns when it is dispersed. Preferred sodium montmorillonites will exhibit between about 70 and about 75% colloid content according to this definition.

The liquid limit of the sodium montmorillonite is a minimum of about 500%. The liquid limit is determined by ANSI/ASTM D-423-66, and determines how much water (by weight) the material will hold without becoming liquid. By the term "solid" as used herein, it is intended to define the compositions which are not pourable. In addition, herein, the term "substantially solid" is intended to be so defined. Normally upper liquid limits of the sodium montmorillonite material used in the invention will be about 750%, with nominal averages being about 600%.

Another important feature of the sodium montmorillonite is the amount of water adsorption determined by a plate water retention test, the material of the invention exhibiting a minimum of about 600%. This retention is determined according to ASTM standard E-946, with the upper practical limit being 1,000% and nominal figures for the most preferred material being between about 750 and about 800%.

The preferred sodium montmorillonite cation exchange capacity is 70 meq/100 grms., up to even 95-100 meq/%; nominal ranges of the preferred material are between about 75 and about 80 meq/%.

A desirable moisture content of the material is a maximum of about 10%, by weight, and that can be achieved by simply drying the material prior to adding it to the liquid to be treated. It will be understood that where higher amounts of moisture are present, the effectiveness of the material for solidifying the liquid compositions will simply be somewhat reduced.

In treating the liquid, different particle size sodium montmorillonites have been found to be more effective depending on the relative water and hydrocarbon content of the liquid. In solidifying liquids having 95% or more water, the preferred material has at least a major portion of particle sizes between about ⅜" and 20 mesh and more preferably at least a major portion of the particle sizes between 4 and 10 mesh (−4+10). In treating liquid compositions having more than about 5% hydrocarbon, the use of a more finely divided sodium montmorillonite is preferred. For treating such liquids, at least some and preferably all of the sodium montmorillonite should pass a 200 mesh screen.

The amount of sodium montmorillonite to be used is in a mineral-liquid ratio of between about 3:1 and about 1:7, by volume, respectively. The bulk density of the mineral (sodium montmorillonite) in the −4+10 mesh particle size range is about 70 to about 75 pounds per cubic foot whereas in the 200 mesh range, the density is about 60 to about 63 pounds per cubic foot so that, the weight ratio of the mineral-liquid used is also between about 3:1 and about 1:7, by weight, respectively. Within those ranges, it is found that where about 95% or more of the liquid to be treated is water, the amount of mineral used to solidify the composition is less then that required for liquids containing more hydrocarbons. For example, where about 75% or more of the liquid is a hydrocarbon, such as turbine oil, the amount of mineral used may be up to as high as about 3:1 mineral:liquid. Specifically, in liquid compositions containing between about 25% and 100% oil, mineral:liquid ratios between about 3:1 and about 1:1.6, respectively, were found to be suitable. On the other hand, where the liquid was substantially 100% aqueous, mineral:liquid ratios of between about 1:2 and about 1:5.2 were suitable. More specifically, when treating liquid waste containing at least about 95% water, it is preferred to use between about 150 and about 175 pounds of the −4+10 mesh mineral with between about 45 and about 48 gallons of liquid in a 55 gallon drum. Preferably when treating liquids having about 95% or more water, the amount of mineral:liquid ratio is between about 1:2 and about 1:7, by weight or volume, respectively. When treating liquids containing 5% or more hydrocarbon, the mineral:liquid ratio is preferably between about 1:2 and about 3:1, respectively.

When adding the montmorillonite, it may be added to the highly aqueous compositions, without stirring. However, it is not to be added all at once and instead should be poured into the liquid in portions or fractions, preferably about ¼ to ⅙ of the total mineral to be used, with at least about 10 minute and preferably 15-20 minute intervals between portion. Thus, for example, between about 40 and about 55 pounds of mineral is added to about 45 to 48 gallons of liquid in a 55 gallon drum. Alternatively, smaller fractions of mineral may be added with shorter intervals. For example, where 25 pound or 1/6 fractions are added, intervals of a few minutes up to about 10 minutes, and preferably about 5 minutes are sufficient. With larger fractions, of say 75 pounds, or one-half of the mineral to be added, longer intervals of 20 minutes and up to 30 minutes are preferred. Where more than about 5% hydrocarbon is present, again, at least a portion or all of the 200 mesh mineral is preferably used and the mixture is stirred in order to solidify the total composition. The method of the invention is preferably used in liquid compositions containing up to 75% hydrocarbon, although, as previously noted, it may be used for 100 % hydrocarbon compositions. Where the liquid contains about 5% or more hydrocarbon, the 200 mesh mineral may be added rapidly, with stirring and without adding it in fractions or between intervals.

Where highly acid or caustic liquids are to be treated it is preferred to neutralize the material to a pH of between about 6.5 and about 9.0 prior to treatment with the sodium montmorillonite although the mineral will be useful for liquids in the pH range from 2–11. Highly concentrated acids require proportionately greater amounts of mineral.

For solidifying the liquid compositions according to the invention, it is quite convenient to utilize a 55 gallon open-top drum before treating and storing the waste liquids. Of course, other containers may also be used, but because of the availability of these 55 gallon drums their use is very desirable. In a specific example of treating liquid according to the invention, between 45 and 48 gallons of the liquid were poured into the 55 gallon drum. Fifty pounds of sodium montmorillonite was added to the drum by pouring the mineral evenly over the liquid surface in order to cover the entire bottom of the drum with the particulate mineral as evenly as possible. The specific montmorillonite used had a sodium content of between 60 and 75 meq/%, calcium 20–35 meq/%, a colloid content of 70–75%, liquid limit of about 600%, a moisture content below 10%, a plate water retention of 750–800% and a total cation exchange capacity of 75–80 meq/100 gm. The liquid contained less than 5% hydrocarbon and the sodium montmorillonite added had a particle size of $-4+10$ mesh. After 15 to 20 minutes, another 50 pound portion of sodium montmorillonite was added and evenly distributed, and 15 to 20 minutes thereafter, a third bag was added. After about 30 minutes, the mixture was inspected and found to be substantially solid. The lid was placed on the drum and after 24 hours the composition was again inspected and found to be substantially solid.

Drums containing compositions treated as above-described were subjected to extremely rough transportation conditions, including being transported 1,000 miles to determine if free liquid would become separated. When the transport tests were completed, the drums were cut open and the solidified mixture was cut in half vertically, and it was found that there was no free water in the samples.

In treating the liquid compositions as a further precaution, if there is free standing liquid on the top of the composition after the appropriate amount of mineral has been added and allowed to stand for 24 hours an additional ½ to 1" of sodium montmorillonite may be added to complete the solidification process, again waiting for 24 hours for inspection. If further free standing liquid occurs, sodium montmorillonite may be used to fill the remaining volume of the drum after which the lid is secured. It has been found that the resulting substantially solid compositions achieved by following the method described herein are slightly alkaline, inert, non-corrosive, and non-biodegradable inorganic systems in which the liquid phase as well as the dissolved and suspended solids are fixed in a non-pourable flexible matrix that will not exhibit brittle fragmentation under accidental spill conditions. Unlike prior art adsorbents used heretofore, which concentrate the liquids in pore spaces, the sodium montmorillonite of the invention is believed to result in a physio-chemical bond yielding a stable homogeneous storage condition which does not undergo phase separation under normal temperature or pressure conditions as well as such conditions which are significantly more extreme than those demonstrated or anticipated in handling or storing such liquids under existing Federally approved storage conditions. Further, there is no evidence to indicate formation of gases or any secondary hazardous products as a result of the solidification process. These advantages as well as others will be evident to those skilled in the art.

We claim:

1. An improved method of solidifying a radioactive or hazardous liquid comprising placing said liquid in a container and adding only sodium montmorillonite to said liquid in a ratio of sodium montmorillonite:liquid of between about 3:1 and 1:7, respectively, until the composition comprises an unpourable, free standing solid.

2. A method of solidifying a radioactive or hazardous liquid comprising at least about 95% water by adding only sodium montmorillonite having a major portion of particles between about ⅜ inch and 20 mesh thereto in a sodium montmorillonite:liquid ratio of between about 1:2 and about 1:7, respectively, in fractions with at least a few minutes interval between fractions, until the composition comprises [an unpourable,] *a* free standing solid.

3. The method of claim 2 wherein each of said fractions is between about 10 and 50% of the total amount added.

4. The method of claim 2 wherein each of said fractions is between about ⅓ and ¼ of the total amount added and wherein the intervals between fraction additions is at least about 10 minutes.

5. The method of claim 2 comprising placing between about 40 and 50 gallons of said liquid in a 55 gallon drum, and adding between about 150 and about 175 pounds of sodium montmorillonite to said liquid in fractions of between about 40 and about 55 pounds with at least about 10 minute intervals between fractions.

6. A method of solidifying a radioactive or hazardous liquid comprising at least about 5% hydrocarbon by adding only sodium montmorillonite having a major portion of particles of about 200 mesh or smaller thereto in a sodium montmorillonite:liquid ratio of between about 1:2 and 3:1, respectively, with stirring, until the composition comprises [an unpourable,] *a* free standing solid.

*7. An improved method of solidifying a radioactive or hazardous liquid comprising adding only sodium montmorillonite to said liquid in a ratio of sodium montmorillonite:liquid of between about 3:1 and 1:7, respectively, until the composition comprises a free standing solid.*

* * * * *